(12) United States Patent
Smith

(10) Patent No.: US 9,896,024 B1
(45) Date of Patent: Feb. 20, 2018

(54) TAMPER RESISTANT AND THEFT RESISTANT VEHICLE LIGHT ASSEMBLY

(71) Applicant: Optronics International, LLC, Tulsa, OK (US)

(72) Inventor: Kenneth Smith, Tulsa, OK (US)

(73) Assignee: Optronics International, LLC, Tulsa, OK (US)

( * ) Notice: Subject to any disclaimer, the term of this patent is extended or adjusted under 35 U.S.C. 154(b) by 90 days.

(21) Appl. No.: 15/043,884

(22) Filed: Feb. 15, 2016

Related U.S. Application Data

(60) Provisional application No. 62/116,700, filed on Feb. 16, 2015.

(51) Int. Cl.
*B60Q 1/26* (2006.01)

(52) U.S. Cl.
CPC ......... *B60Q 1/2623* (2013.01); *B60Q 1/2696* (2013.01)

(58) Field of Classification Search
CPC .......................................... B60Q 1/26–1/2653
See application file for complete search history.

(56) References Cited

U.S. PATENT DOCUMENTS

| | | |
|---|---|---|
| 6,502,975 B1 | 1/2003 | Branstetter |
| 9,285,110 B2 * | 3/2016 | Branstetter ........... F21V 15/005 |
| 2013/0148374 A1 * | 6/2013 | Branstetter ........... F21V 15/005 362/543 |

* cited by examiner

*Primary Examiner* — Christle I Marshall
(74) *Attorney, Agent, or Firm* — Head, Johnson, Kachigian & Wilkinson, PC

(57) ABSTRACT

A tamper resistant and theft resistant light assembly for a tractor trailer or other vehicle that can be easily installed on the vehicle but cannot be removed without being broken. The light assembly may have one or more flexible projection fingers that deform to allow the light assembly to be mounted on the vehicle body plate by pushing the light assembly into an opening therein, but prevent the light assembly from being removed from the opening. The light assembly has a mounting ring that breaks away from the light assembly if an attempt is made to pry the light assembly out of the opening.

8 Claims, 7 Drawing Sheets

TAMPER RESISTANT AND THEFT RESISTANT VEHICLE LIGHT ASSEMBLY

CROSS REFERENCE

This application claims priority to and the benefit of U.S. Provisional Patent Application Ser. No. 62/116,700 filed Feb. 16, 2015, which is herein incorporated in its entirety by reference.

BACKGROUND OF THE INVENTION

Field of the Invention

This invention relates generally to a vehicle light assembly, and more particularly, but not by way of limitation, to a light assembly for a tractor trailer or other vehicle that cannot be removed from the vehicle without being broken, thus deterring tampering and deterring thieves from stealing the light assembly.

Related Art

It is possible to permanently attach a light assembly to a vehicle, however, lights for tractor trailers and other vehicles are typically modular light assemblies, allowing them to be easily replaced as needed. The light mechanism, such as an incandescent bulb or light emitting diode, are a single integrated unit. This modular design also makes the typical light assembly easy to steal or tamper with. For example, a light assembly held in place with one or more screws is easily removed with just a screwdriver.

The penalty for driving a tractor trailer without proper lights can be sizable, but repairing or replacing a broken or missing light can take a significant amount of time and ruin a driver's schedule. Thus, some unscrupulous drivers have been known to steal a light from another tractor trailer, mount it to their own vehicle, and continue on their way.

Grote (U.S. Pat. No. 6,502,975) illustrates an earlier attempt to lock a light assembly to a vehicle body. A variety of rigid locking tabs attempt to accommodate different thicknesses of vehicle plate material.

Based on the foregoing, it is desirable to provide a light assembly that is easy to install but that cannot be easily removed.

It is further desirable to provide a light assembly to be installed by pushing the light assembly onto the vehicle body without the use of any tools.

It is further desirable to provide a light assembly to attach to the vehicle without the use of screws, rivets, or similar removable attachment devices.

It is further desirable to provide a light assembly to be removable only by breaking the light assembly, preventing its reuse and acting as a theft deterrent.

It is further desirable to provide a light assembly to have a breakaway feature to prevent a third party from tampering with the light assembly or prying the light assembly off of a vehicle.

It is further desirable to provide a light assembly which may be installed on vehicle body plates having a wide variety of thicknesses.

SUMMARY OF THE INVENTION

The present invention relates to a light assembly for mounting in an opening in a vehicle body plate. The light assembly comprises a housing or body and a flange in the form of a mounting ring extending radially from the housing or body. The light assembly may further comprise a light source housed within the housing or body and attached to the body such that light from the light source may be seen outside the body through a lens. The flange or mounting ring may surround the lens. The light assembly may further comprise a gasket located adjacent the flange or mounting ring such that the gasket is located between the flange or mounting ring and the plate when the light assembly is in place within the opening.

The light assembly may further comprise one or more flexible projection fingers extending radially from the housing or body and angling toward the flange or mounting ring, where the flexible projection fingers are spaced from the flange, such that when the body is placed within the opening, the projection fingers deform to allow the projection fingers past the plate but return to an undeformed state to prevent the removal of the housing or body from the opening. The opening may be circular and have a diameter. The housing or body may have a circular cross section and a diameter less than the diameter of the opening. The flange or mounting ring may also be circular and have a diameter greater than the diameter of the opening. The projection fingers may extend in a radial pattern with a diameter greater than the diameter of the opening, but may be deformed to have a diameter less than the diameter of the opening. The plate may have a thickness and the flexible projection fingers may be spaced from the flange or mounting ring at least the thickness of the plate such that the flange may be located on one side of the plate and the projection fingers may be located on an opposing side of the plate when the light assembly is in place within the opening. The one or more projection fingers may be part of a locking ring encircling the housing or body.

Additionally or alternately, the back of the flange or mounting ring may have an annular groove such that the flange or mounting ring breaks off if an attempt is made to pry the light assembly out of the opening.

and

Figure 12:
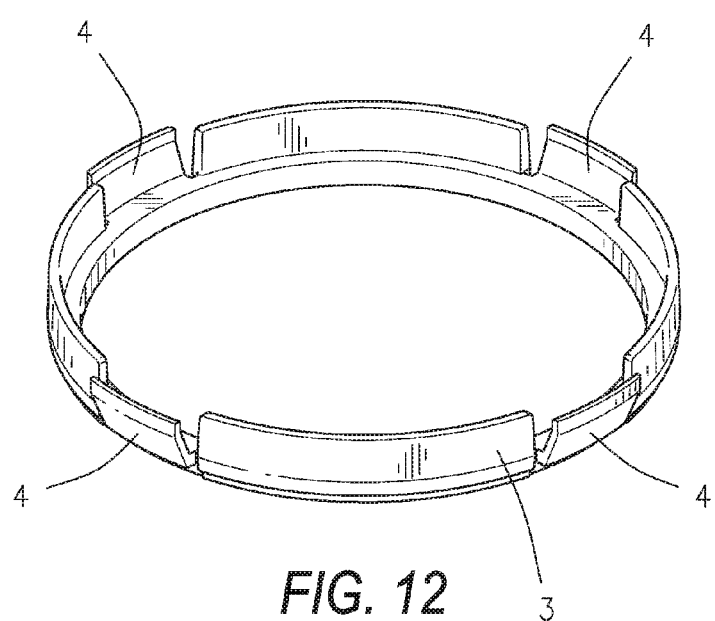

FIG. 12 is a perspective view of a locking ring apart from the rest of the light assembly.

Other advantages and features will be apparent from the following description and from the claims.

DETAILED DESCRIPTION OF THE INVENTION

The devices discussed herein are merely illustrative of specific manners in which to make and use this invention and are not to be interpreted as limiting in scope.

While the devices have been described with a certain degree of particularity, it is to be noted that many modifications may be made in the details of the construction and the arrangement of the devices and components without departing from the spirit and scope of this disclosure. It is understood that the devices are not limited to the embodiments set forth herein for purposes of exemplification.

The present invention relates to a light assembly that is both tamper resistant and that cannot easily be stolen without being broken, thus deterring potential thieves from attempting to steal the light assembly. The light assembly is particularly useful on tractor trailers, but may also be used on other vehicles or for non-vehicular purposes. The light assembly may be directly mounted to a vehicle body without any screws or rivets. Mounting the light assembly may be easy and save time, as users may be able to mount the light assembly by pushing onto the vehicle body without any tools. Without any external screws or rivets holding the light assembly in place, the light assembly may not be easily removed and stolen. The light assembly has a tamper resistant feature of a groove as well as fracture elements that breaks off if someone tries to pry the light assembly off the vehicle, making it less likely to be stolen for reuse.

Figure 1:
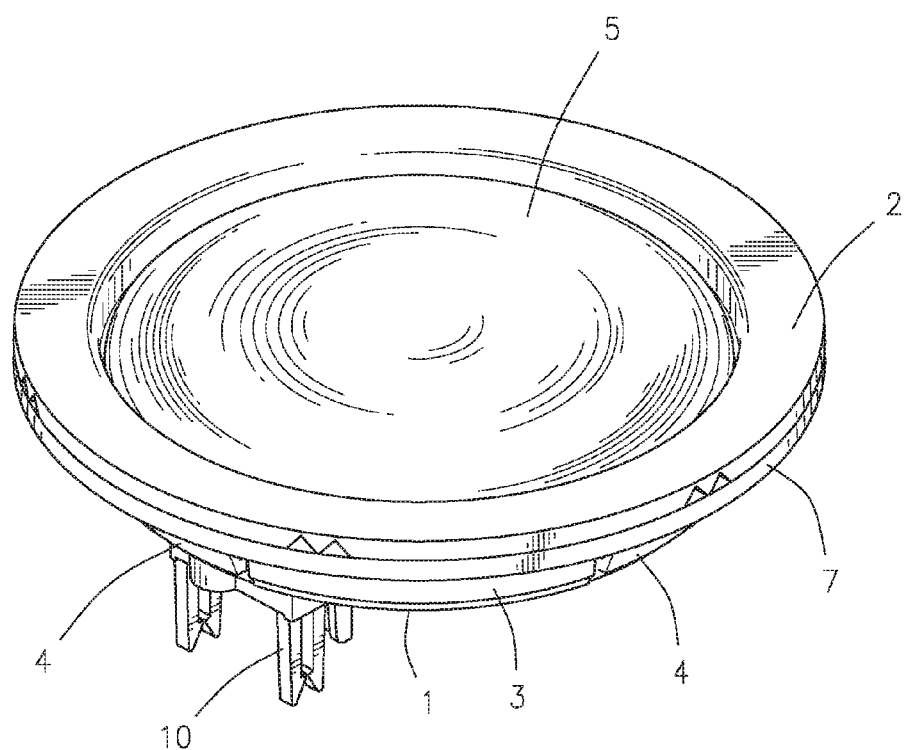
FIG. 1 is a perspective view of a tamper resistant and theft resistant vehicle light assembly constructed in accordance with the present invention.
Figure 2:
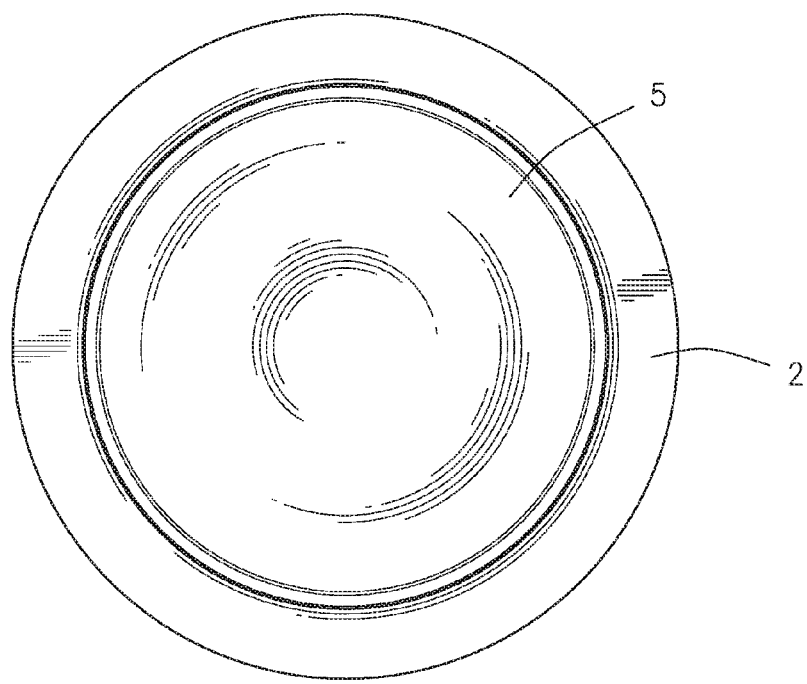
FIG. 2 is a top view of the light assembly shown in FIG. 1.
Figure 3:
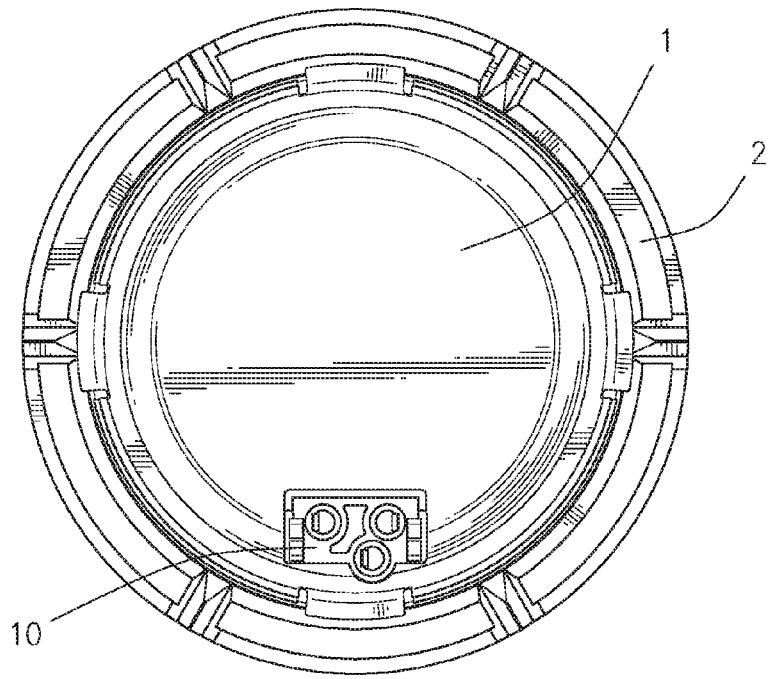
FIG. 3 is a bottom view of the light assembly shown in FIG. 1.
Figure 4:
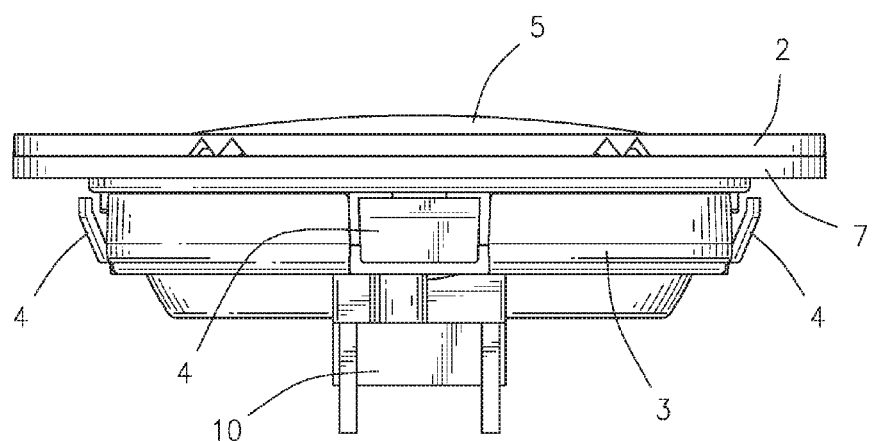
FIG. 4 is a side view of the light assembly shown in FIG. 1.
Figure 5:
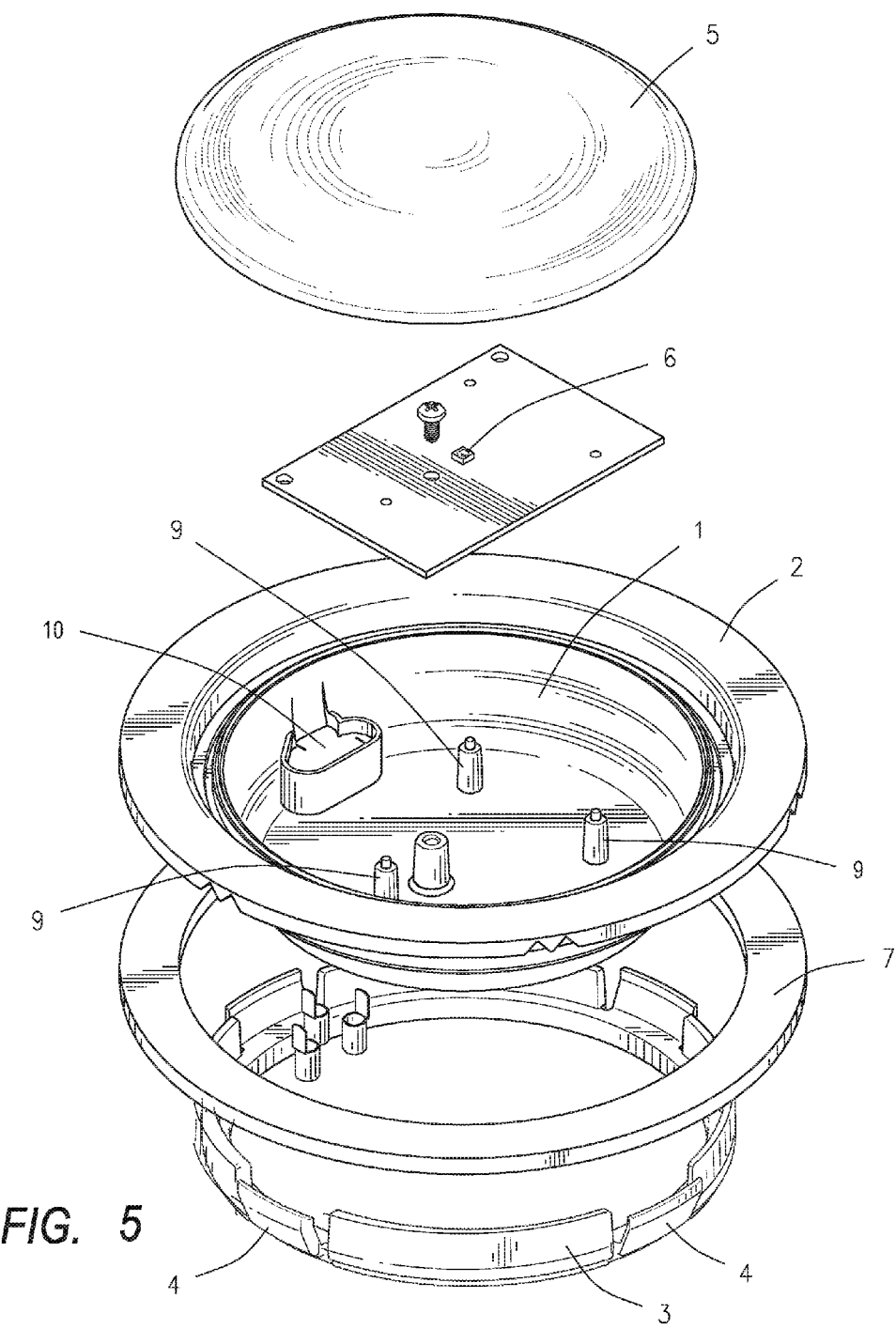
FIG. 5 is an exploded view of the light assembly shown in FIG. 1.

Referring to the drawings in detail, FIG. 1 is a perspective view, FIG. 2 is a top view, FIG. 3 is a bottom view, FIG. 4 is a side view of a light assembly and FIG. 5 is an exploded view. The light assembly may be circular as shown in the present embodiment, may be oval, or may take other configurations within the scope of the invention.

The light assembly may have a substantially cylindrical or conical base housing or body 1 forming a closed base or bottom and an open top. A radially extending flange or mounting ring 2 is substantially perpendicular to a base housing or body 1. The assembly also includes a locking ring 3 with one or more flexible projection fingers 4 to be described in detail. The assembly also includes a lens 5 to enclose the open top of the body, a light source 6, and a gasket 7, or any combination of the foregoing.

The base housing or body 1 may fit substantially within an opening in a vehicle body plate 8, with the flange or mounting ring 2 having a diameter larger than the opening and extending over the vehicle body plate 8 surrounding the opening.

Figure 6:
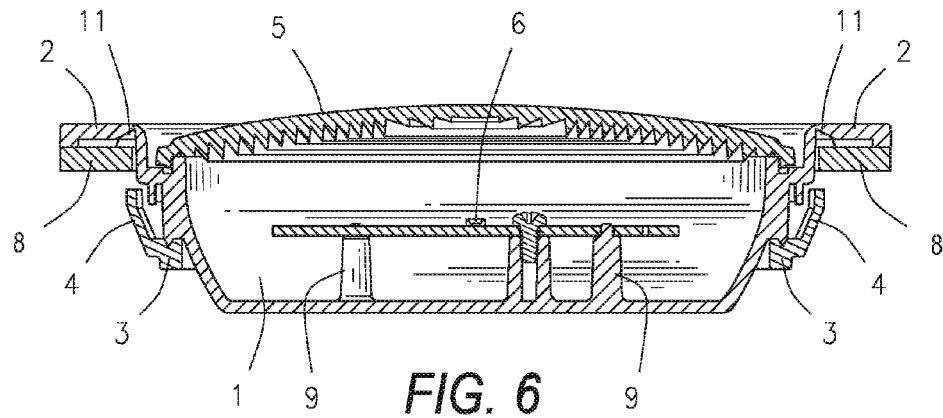
FIG. 6 is a side cross-sectional view of the light assembly installed in place on a vehicle.

FIG. 6 illustrates a cross-sectional view of the light assembly 10 installed in an opening in the vehicle body plate 8.

The locking ring 3 may be substantially rigid and encircle the housing or body 1. The flexibility of the fingers 4 permits the ends of the fingers 4 to move radially. In one non-limiting example, the flexibility of the projection fingers will accommodate vehicle plate thicknesses of 0.06 to 0.250 inches. The locking ring 3 may snap into place on the body 1 or may be held in place via adhesive or other attachment device. Alternately, the locking ring 3 may be integrally formed with the housing or body 1.

The flexible projection fingers 4 may be spaced periodically circumferentially around the locking ring 3. Each of the flexible projection fingers 4 extends upward from the base of the locking ring toward the flange or mounting ring 2 and radially outward from the ring 3. Each of the projection fingers is disconnected from the ring 3 along their sides, such that they are only connected along their bottom. The projection fingers are fabricated from a material that is flexible.

Given an opening in a vehicle body plate 8 with a certain diameter, the flange or mounting ring 2 will have a larger diameter than the opening, the locking ring 3 may have a smaller diameter than the opening, and the projection fingers 4 may extend beyond the diameter of the plate opening when in a relaxed state but may be compressed to fit within the opening when projection fingers 4 are compressed.

Thus, during installation, the user may begin inserting or placing the housing or body 1 within the opening in the vehicle body plate 8. As the ring 3 attached to the body enters the opening, the projection fingers 4 may deform and flex sufficiently to travel past the opening. Once past the vehicle body plate 8, the projection fingers 4 will return to their relaxed state, extending beyond the opening in the vehicle body plate 8, thus preventing the housing or body 1 from being withdrawn from the opening in the vehicle body plate 8.

The flange or mounting ring 2 prevents the housing or body 1 from continuing entirely past the vehicle body plate 8, thus securing the housing or body 1 within the opening, with the flange or mounting ring 2 extending beyond the opening on the front of the vehicle body plate 8 and the projection fingers 4 extending beyond the opening on the back of the vehicle body plate 8.

The base housing or body 1 has an open upper end which holds the lens 5, behind which may be mounted a light source 6. The flange or mounting ring 2 may surround the lens 5. The light source 6 may be any desired light source, such as one or more LEDs, which may be mounted to an array or board, as shown. The light source 6 may be electrically connected (not shown) to a modular connector 10 in order to connect with a vehicle electrical system.

The base housing or body 1 may include one or more posts 9 to support the light source 6. The housing or body 1 may have a housing 10 for a Pl 3 or other plug for connecting the light source 6 to the vehicle electrical system.

A gasket 7 may be located adjacent the back of the flange or mounting ring 2, such that the gasket 7 is located between the flange or mounting ring 2 and the vehicle body plate 8 when the light assembly is mounted thereto. The gasket 7 may be connected to the flange or mounting ring 2 via adhesive.

Figure 7:
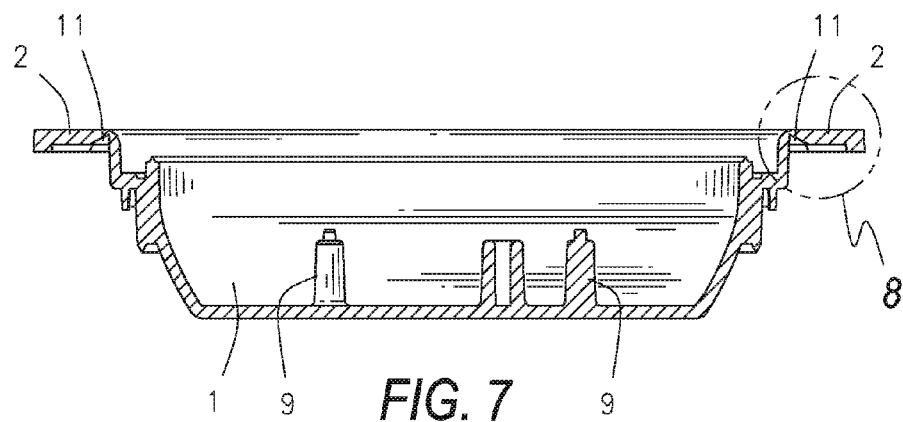
FIG. 7 is a side cross-sectional view of a housing or body apart from the rest of the light assembly.
Figure 8:
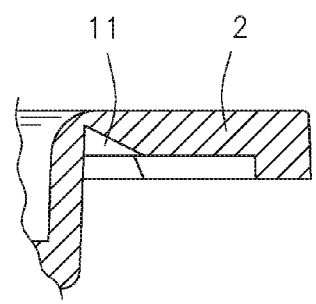
FIG. 8 is an enlarged cross sectional view of a portion of a flange or mounting ring of the light assembly.
Figure 9:
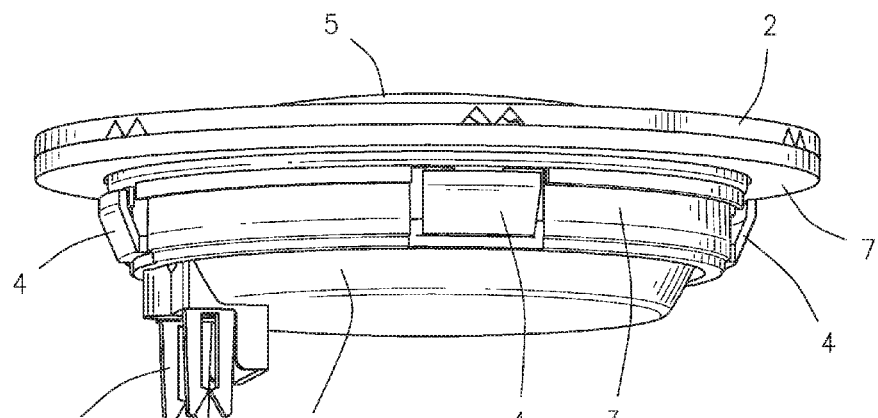
FIG. 9 is an alternate side view of the light assembly.
Figure 10:
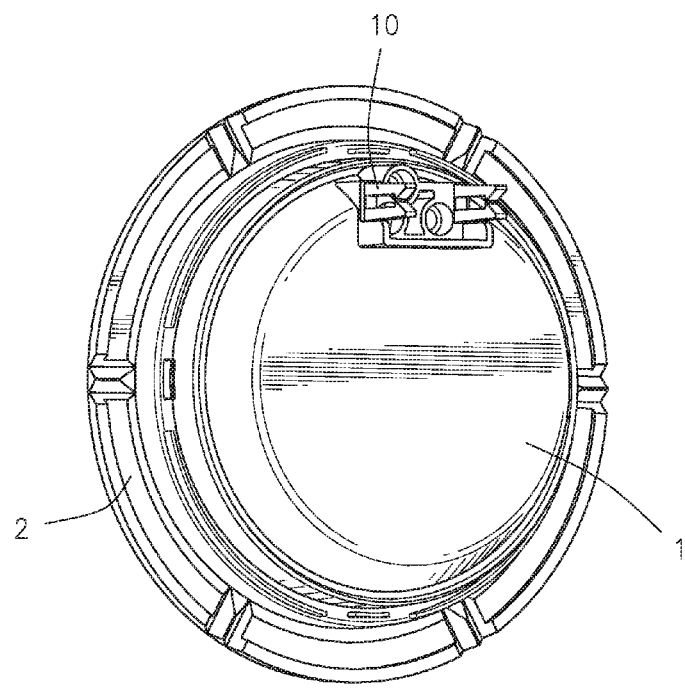
FIG. 10 is a perspective view of the back of the light assembly.
Figure 11:
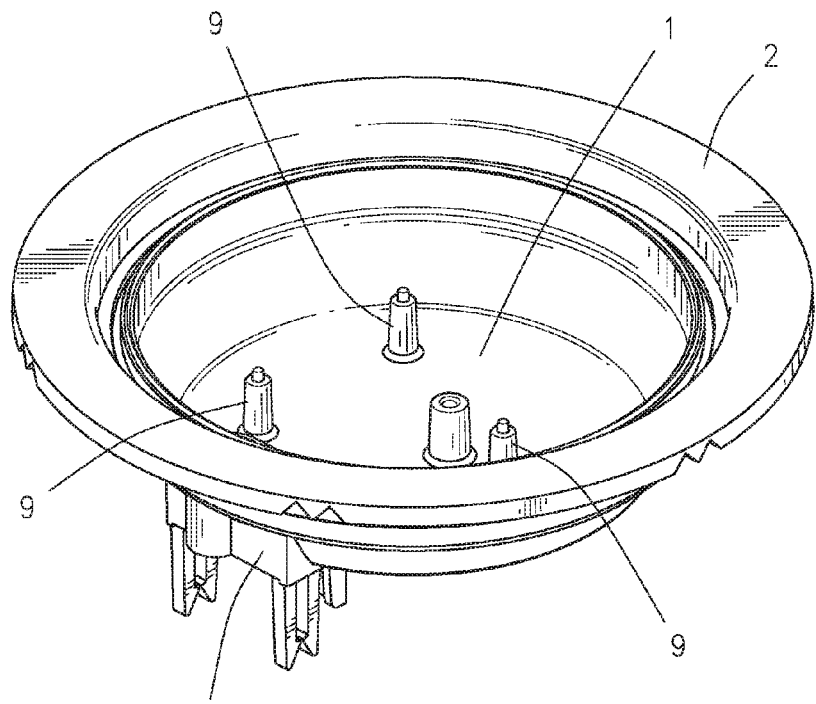
FIG. 11 is a perspective view of the inside of the housing or body of the light assembly.

In one embodiment, the light assembly includes a tamper resistant mechanism. FIG. 7 illustrates a sectional view of the base housing or body 1 apart from the assembly. The back or underside of the flange or mounting ring 2 may have a groove 11 near where the flange or mounting ring 2 extends from the housing or body 1. The groove 11 may be annular and extend further than halfway through the thickness of the flange or mounting ring 2. The groove 11 may extend far enough through the thickness of the flange or mounting ring 2 that the flange or mounting ring 2 is easily broken at the groove 11. In addition, the back or underside of the mounting ring 2 may include a plurality of radial grooves or fractures which extends partway through the thickness of the mounting ring 2.

Thus, in normal use, the flange or mounting ring 2 is attached to the housing or body 1. If someone tampers with the light assembly and places a screwdriver between the flange or mounting ring 2 and the vehicle body plate 8 and attempts to pry the light assembly from the vehicle, the majority of the flange or mounting ring 2 will break off before the locking tips 4 fail, thus preventing the removal of the light assembly. Any part of the flange or mounting ring 2 that remains may be off insufficient size to allow the necessary leverage to remove the light assembly. The light assembly may still be usable after the flange or mounting ring 2 breaks off, however, it will be difficult to remove and re-install on another vehicle.

The present invention provides a tamper resistant and theft resistant vehicle light assembly having a body with an open top, a light source within the body and a lens covering the open top. A flange or mounting ring extends radially from the open top. One or more flexible projection fingers extend upward toward the flange or mounting ring and outward radially from the housing or body so that the projection fingers deform to allow the fingers to move past a plate when installed but return to an undeformed state to trap the assembly and prevent removal of the body.

Whereas, the devices and methods have been described in relation to the drawings and claims, it should be understood that other and further modifications, apart from those shown or suggested herein, may be made within the spirit and scope of this invention.

What is claimed is:

1. A light assembly for mounting in an opening in a plate, the light assembly comprising:
    a body having an open top;
    a mounting ring attached to and extending radially from the open top of the body, wherein a back of the mounting ring faces the plate when the light assembly is in place within the opening, and wherein the back of the mounting ring has a groove with a diameter less than said opening in said plate, such that said mounting ring breaks off if an attempt is made to pry the light assembly out of the opening;
    one or more flexible projection fingers extending radially from the body and angling toward the mounting ring, where the one or more projection fingers are spaced from the mounting ring, such that when the body is placed within the opening, the projection fingers deform to allow the projection fingers past the plate but return to an undeformed state to prevent the removal of the body from the opening.

2. The light assembly of claim 1 where:
    the opening is circular and has a diameter;
    the body has a circular cross section with a diameter less than the diameter of the opening;
    the mounting ring is circular and has a diameter greater than the diameter of the opening; and
    the one or more projection fingers extend in a radial pattern with a diameter greater than the diameter of the opening, but may be deformed to have a diameter less than the diameter of the opening.

3. The light assembly of claim 1 where the plate has a thickness and where the one or more projection fingers are spaced from the mounting ring at least the thickness of the plate such that the mounting ring may be located on one side of the plate and the projection fingers may be located on an opposing side of the plate when the light assembly is in place within the opening.

4. The light assembly of claim 1 where the plate is a vehicle body plate.

5. The light assembly of claim 1 further comprising a light source housed within the body and attached to the body such that light from the light source may be seen outside the body through a lens covering the open top.

6. The light assembly of claim 1 further comprising a gasket located adjacent the flange such that the gasket is located between the mounting ring and the plate when the light assembly is in place within the opening.

7. The light assembly of claim 1 where the one or more flexible projection fingers extend from a locking ring encircling the body.

8. The light assembly of claim 1 where the groove is annular and is adjacent to the body.

* * * * *